United States Patent [19]

Carr

[11] 4,026,596
[45] May 31, 1977

[54] CONTAINER HOLD DOWN LOCKING MEANS

[75] Inventor: George W. Carr, Albuquerque, N. Mex.

[73] Assignee: Pullman Incorporated, Chicago, Ill.

[22] Filed: June 5, 1975

[21] Appl. No.: 584,236

[52] U.S. Cl. ............................................ 296/35 A
[51] Int. Cl.² .......................................... B65J 1/22
[58] Field of Search .............. 296/35 A; 105/366 B; 248/361 R

[56] References Cited

UNITED STATES PATENTS

| | | | |
|---|---|---|---|
| 3,612,466 | 10/1971 | Arnold | 105/366 B |
| 3,717,372 | 2/1973 | Carr | 296/35 A |
| 3,768,857 | 10/1973 | Horton | 296/35 A |
| 3,825,294 | 7/1974 | Carr | 296/35 A |

*Primary Examiner*—Robert R. Song
*Attorney, Agent, or Firm*—Richard J. Myers

[57] ABSTRACT

Coupling assemblies for coupling a trailer chassis to the corner castings of a container each include a vertical cone head and coupling pin rotatable and vertically positionable in a stationary tubular extension mounted in a housing, one of which is connected to each of the lateral ends of conventional front and rear chassis bolsters. Each housing includes a guide slot in a wall through which a handle and operating rod projects. As the rod is moved in the slot to pivot the coupling pin from open to lock position, it is rotatable about its axis. The rod includes cam means having stop and camming surfaces which are engageable with projections and surfaces on the lower ends of the stationary tubular extensions within which the coupling pin is movable to selectedly latch the pin in either an open position, a first vertical lock position, to accommodate a certain thickness of the base of a corner casting, and into a second position to accommodate a different thickness of corner casting base.

10 Claims, 8 Drawing Figures

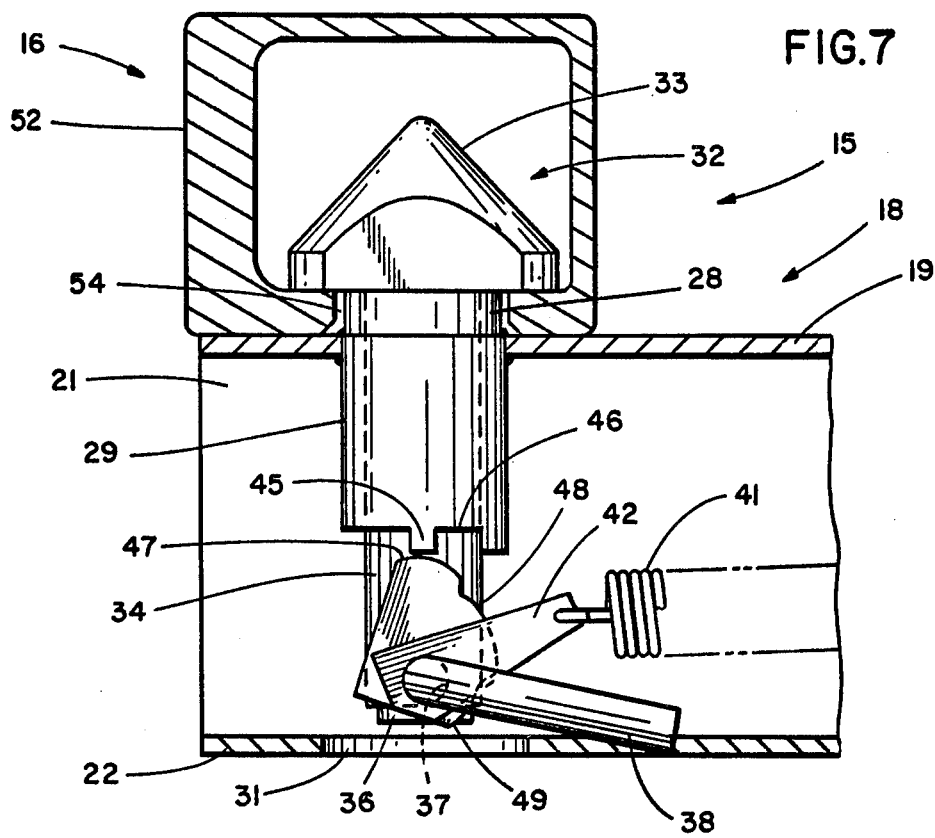
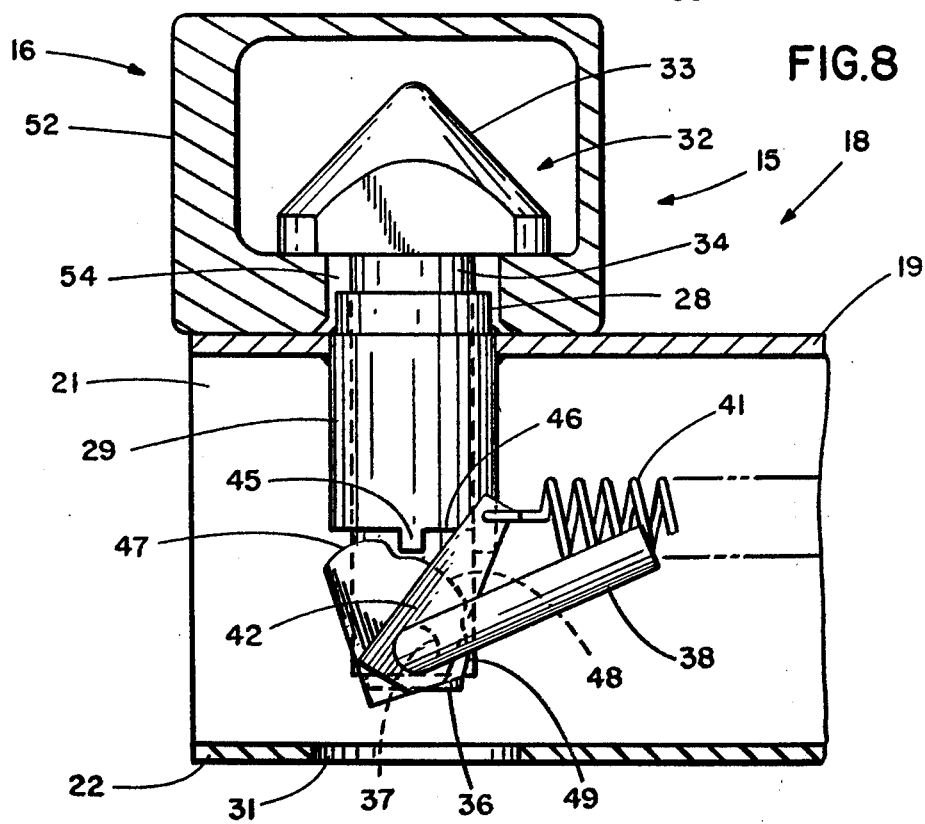

CONTAINER HOLD DOWN LOCKING MEANS

BACKGROUND OF THE INVENTION

1. Field of the Invention

The field of art to which this invention pertains is the highway trailer art and in particular it relates to means for coupling the trailer chassis to a removable container carried thereon.

2. Description of the Prior Art

Some of the prior art is illustrated in my U.S. Pat. Nos. 3,701,562, Oct. 31, 1972; 3,717,372, Feb. 20, 1973; 3,719,385, Mar. 6, 1973 and 3,825,294 July 23, 1974.

This invention is an improvement over the prior art in that the present container hold-down locking pin arrangement is easily adjustable to a variety of positions which include accommodating and firmly connecting the container to the chassis by the engagement of the locking pin with a variety of different thickness corner casting bases which may be utilized in different containers.

SUMMARY OF THE INVENTION

The invention relates to a chassis-to-container locking mechanism, and in particular to locking means for coupling demountable containers to chassis of highway trailers. It is a primary object of the present invention to provide an effective twist lock that may be readily adjusted to lock in an open position and in a closed position and also which may be positioned in a variety of vertical positions so as to accommodate various thicknesses of corner casting bases which are utilized in different types of containers.

In the present invention, the twist lock includes a pin conventionally positioned within a tubular extension with the cone of the twist lock supported on a shear block also connected to the tubular extension. A rod is rotatable within a horizontal bore in the lower end of the twist lock shank and includes a pair of cam members supported on the rod on opposite sides of the shank. The rod extends outwardly through a guide slot having a downwardly extending, diagonally sloping guide surface. The cam members include stop surfaces adapted to engage projections on the lower end of the tubular extension which are engageable with the stop means on the cam members to lock the twist lock in an elevated open position. The cam elements further include first and second cam surfaces which, during rotation of the rod, position and engage portions of the tubular extension for locking the twist lock in first and second positions which will accommodate bases of different height or thickness found in various containers. The twist lock also is associated with spring means which normally biases the operating lock and handle to a locked position.

BRIEF DESCRIPTION OF THE DRAWINGS

FIGS. 7 and 8 are elevational views showing the locking mechanism applied to containers having container castings of different base height.

DESCRIPTION OF THE PREFERRED EMBODIMENT

Figure 1:
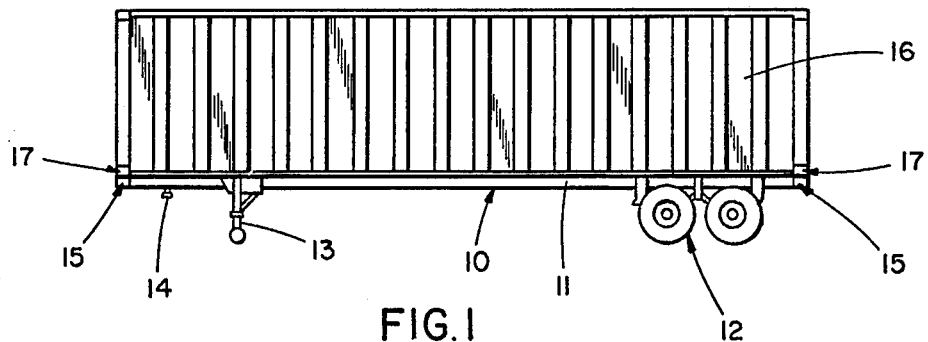
FIG. 1 is a side elevational view of a chassis and removable container including forward and rearward container locks.

Referring now particularly to FIG. 1, an over-the-highway trailer chassis 10 includes a horizontal chassis frame 11 supported at its rear end on a wheel suspension 12 and having at its front end a landing gear construction 13. The chassis is equipped with the conventional king pin 14 which is adapted to be attached to the fifth wheel of a highway tractor (not shown). The container is generally designated at 16 and is provided at its lower four corners with conventional container corner castings 17.

Figure 5:
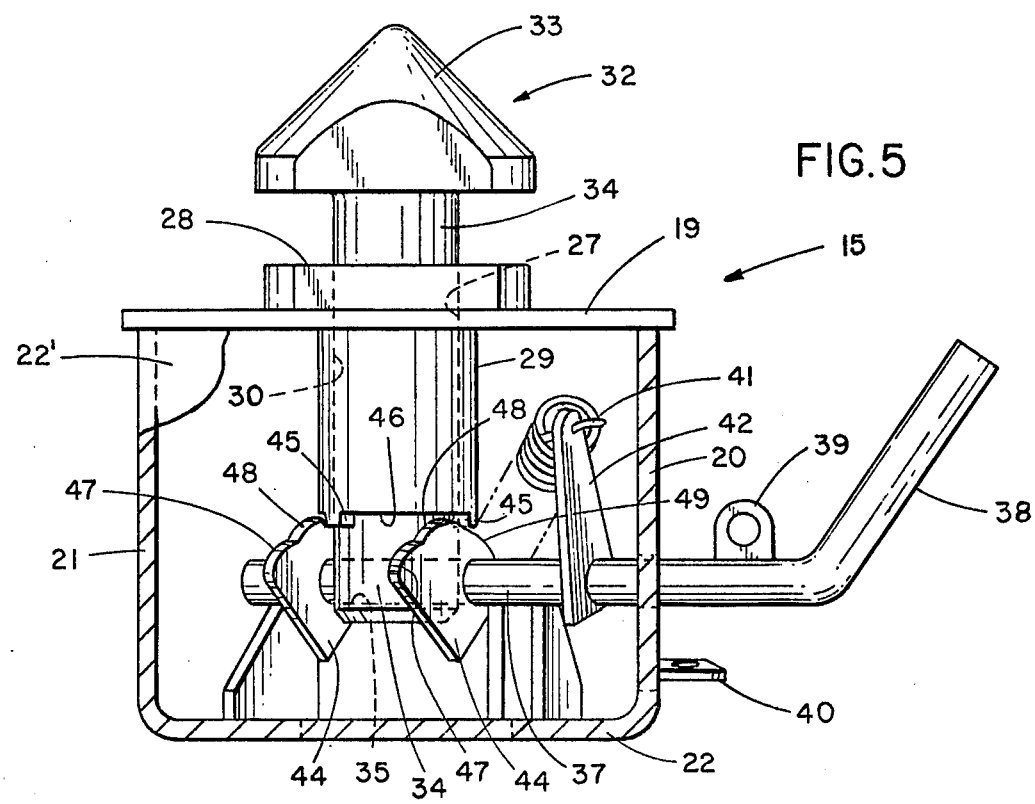
FIG. 5 is a side elevational view with a wall portion broken away showing the interior of a hold down locking means.
Figure 6:
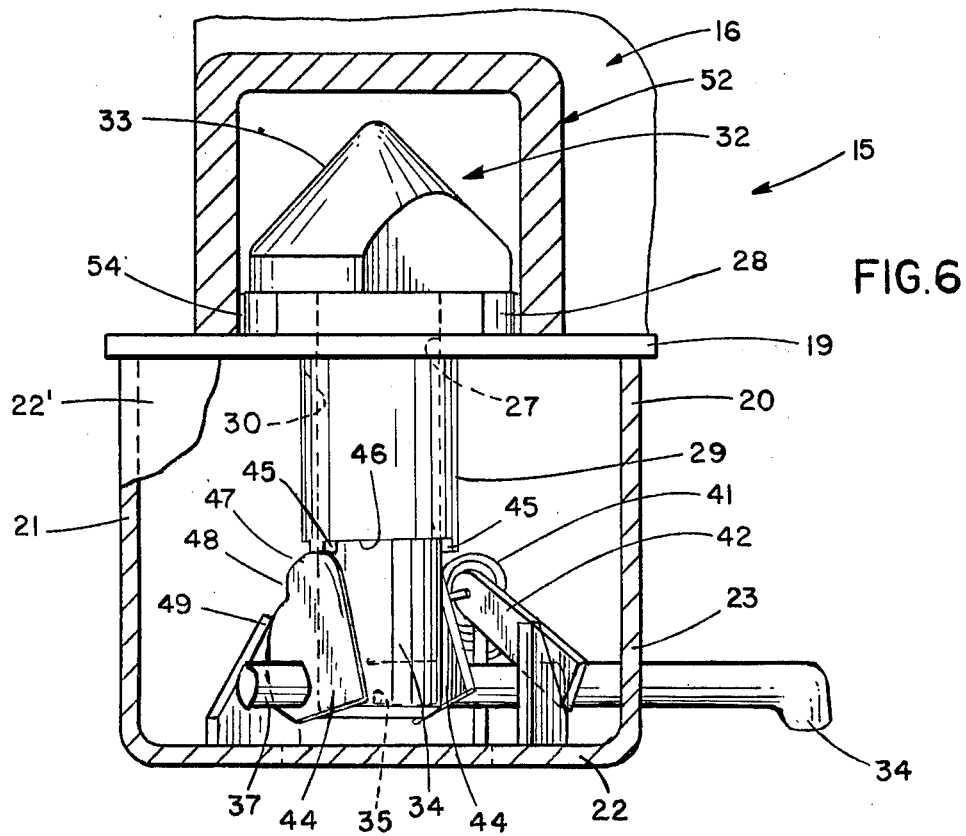
FIG. 6 is a view similar to FIG. 5 showing another position of a hold down locking means.

As best shown in FIG. 1, the corner castings 17 are seated on top of coupling assemblies 15. Each coupling assembly 15 includes a locking housing 18, each of which is connected to the opposite ends of front and rear cross bolsters of a box-like construction attached to the front and rear chassis the same not being shown since they are conventional in the art. Each locking housing includes a top wall 19 connected to vertical walls 20 and 21, in turn connected to a bottom wall 22. As best shown in FIGS. 5 and 6, end closure walls 22' enclose the locking housing 18. The wall 20, which on the rear of the chassis faces rearwardly and which on the front end of the chassis faces forwardly, includes a guide slot 23 having a horizontal slot portion 24 providing a horizontal guide surface 25, and further includes a diagonal or downwardly sloping guide surface 26. The top wall 19 is provided with a vertical opening 27 over which a tubular shear block 28 is rigidly connected. The tubular shear block 28 includes a downwardly projecting extension 29 rigidly supported within the housing 18 from the top wall 19. The tubular extension 29 includes a cylindrical bore 30 in substantially vertical alignment with an aperture 31 formed in the bottom wall 22.

A twist lock member or lock pin generally designated at 32 includes at its upper end a cone-shaped head 33, which is rigidly connected to a shank 34 positioned for rotation within the tubular extension 29, and being vertically adjustable with respect thereto. The lower end of the shank 34 is provided with a horizontal bore or groove 35. Operating means in the form of a cylindrical rod 37 is rotatably positioned within the horizontal groove 35 and is held therein by means of a retainer 36 securely fastened to the lower face of the lock pin shank 34. The end of the cylindrical rod 37 is provided with a handle 38 and the operating rod 37 projects through the slot 23 and being guided therein by the guide surfaces 25 and 26.

Figure 4:
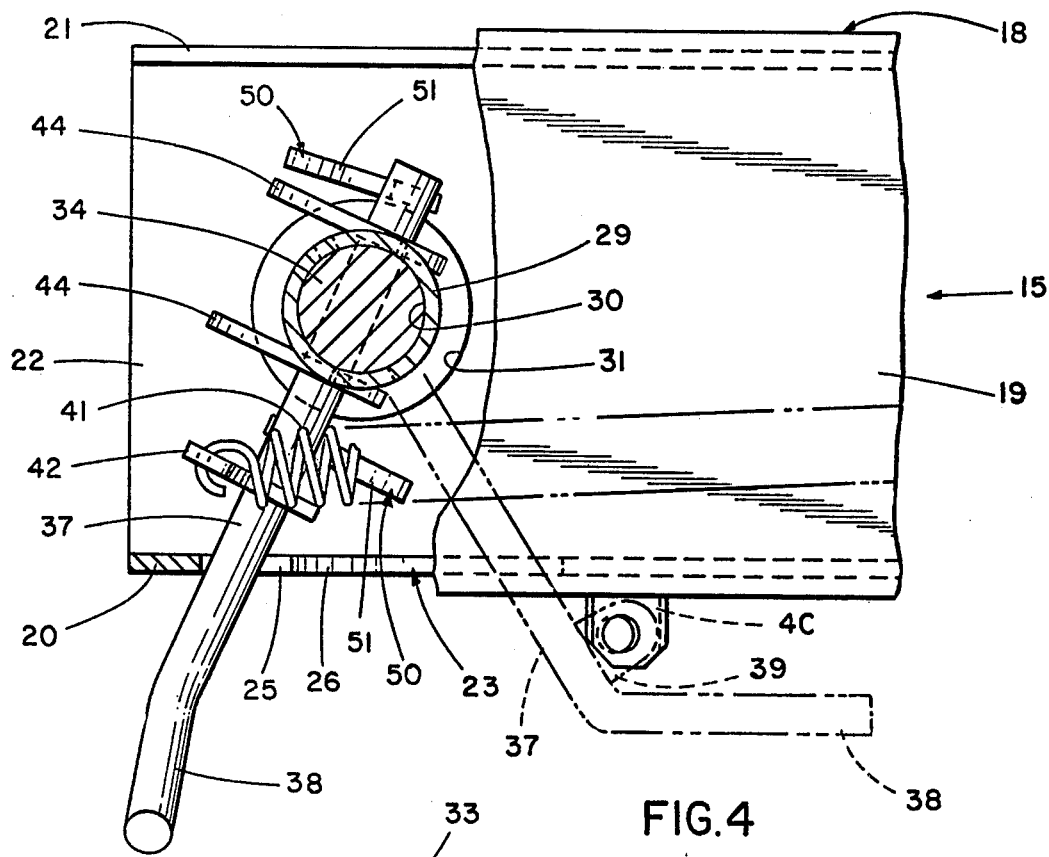
FIG. 4 is a sectional view taken substantially along the line 4—4 of FIG. 3.

As best shown in FIGS. 4 and 5, the rod 37 has connected thereto an apertured locking finger 39, which is adapted to register with an apertured lock tab 40 supported on the wall 20. An elongated spring 41 is connected to a spring arm 42 projecting upwardly and connected to the rod 37.

Figure 3:
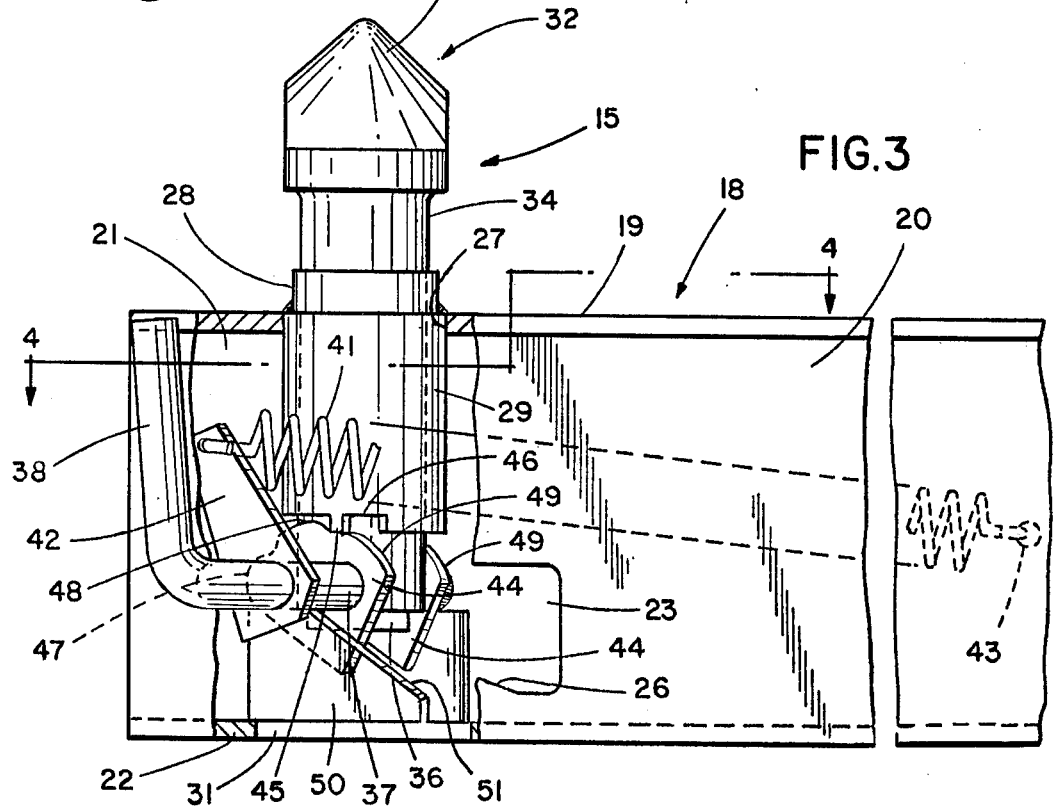
FIG. 3 is an elevational view, partially broken away, to show the interior of a housing container locking means.

As best shown in FIG. 3, the other end of the spring 41 is anchored to the housing, as indicated at 43. A pair of cam members 44 are connected to and for rotation with the rod 37 on opposite sides of the shank 34.

Figure 2:
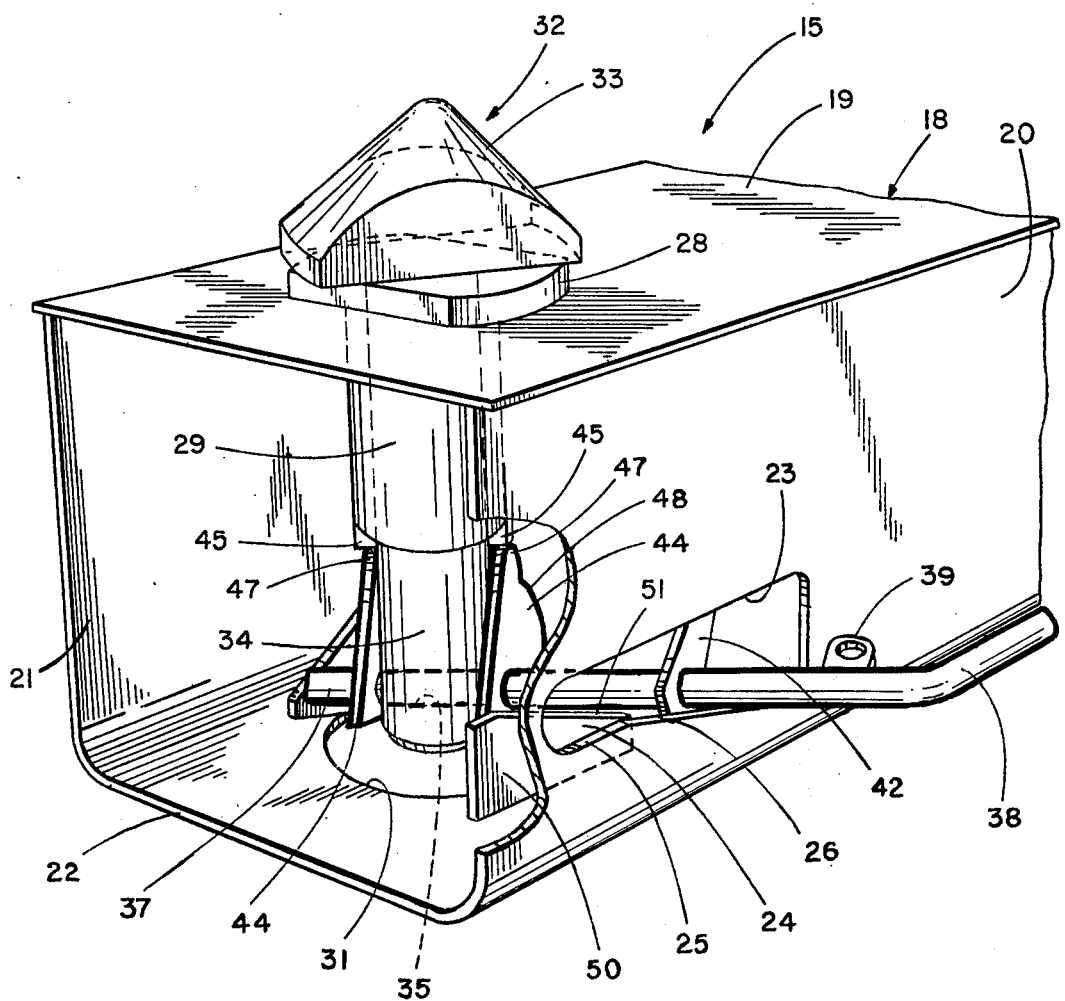
FIG. 2 is a perspective view, with portions broken away, of a container hold down locking means.

As best shown in FIGS. 2 and 3, the lower ends of the tubular extension 29 are provided with a pair of cam engageable projections 45, extending downwardly from undercut edges 46. Each of the cam members 44 includes laterally aligned stop means or cam surfaces 47. The surfaces 47 are of arcuate shape and are joined to arcuate cam surfaces 48, which in turn are also connected or joined to laterally aligned arcuate surfaces 49. The cam surfaces 47 are disposed radially outwardly a further distance from the axis of the rod 37 than the surface 48. Likewise, the surface 48 is disposed radially outwardly a further distance from the axis of the rod 37 than the surface 49 for reasons to be presently disclosed.

As best shown in FIGS. 2, 3 and 4, auxiliary support brackets 50 are supported on the lower wall 22 and project vertically upwardly with respect thereto. Each of the brackets 50 includes an upper surface 51 generally conforming to the sloping surfaces 26 of the slot 23. FIG. 6 discloses the corner portion of the container 16 having the corner castings 17 which includes a housing 52 positioned in locked relation with respect to one of the cones 33 of the twist lock member 32. The corner castings 17 are of conventional design which include a bottom attaching wall or base 54, which is suitably apertured to receive the cone head 33, which upon rotation locks the bottom wall or base 54 to the coupling assembly 15. The base wall shown in FIGS. 6 and 7 are of a thickness of ⅝ of an inch. In FIG. 8, another conventional corner casting discloses a thickness of the base wall 54 as being approximately 1⅛ inches.

THE OPERATION

The open position, or unlocked position, of the lock assembly is disclosed in FIGS. 3, 4 and 5, whereas the closed position is shown in FIGS. 2, 6, 7 and 8. In the open position, the cone 33 is at its maximum vertical height and is ready to receive a container to be loaded on the chassis. In this position the rod 37 is at its extreme end in the horizontal slot 24 and seated upon the guide surface 25. This is at the highest point of the slot 23. In this position the cam face 49 is disposed immediately below the projections 45 and the higher cam surface 48 is in engagement with the projection 45 also. In this position, the spring 41 is urging the arm 42 and rod 37 to rotate in a clockwise direction but is so prevented by the engagement of the cam 48 and position of the cam 49 with relationship to the projections 45. Thus, the spring 41 effectually locks the rod 37 and cone in the open position. Assuming now that a container is crane loaded downwardly on top of the chassis and the corner castings with their apertures in alignment now are placed in mating relation with respect to the cones 33 and the container is properly seated on the locking assemblies. The operator now grasps the handle 38 and slides the same downwardly on the diagonal guide surface 26 of the slot 23, whereby the shank 34 and cone head 33 is lowered. As the rod 37 now slides down the surface 26 and the shank 34 is lowered, simultaneously pivotal action of the shank 34 is effective to swing the rod 37 from the full line position 38 to the broken line position of FIG. 4. Thus, rotation of the shank and lowering of the shank is accomplished simultaneously with movement of the rod downwardly in the diagonal portion of the slot. The cone then in conventional fashion rests upon the top surface of the base of the casting. Assuming now that, as shown in FIGS. 6 and 7, the base has a ⅝ inches thickness the handle now is turned to the position shown in these figures, wherein the highest cam surface 47 is now disposed underneath or in engagement with the projections 45 wherein the cone is securely locked within the corner casting against upward movement. The spring tension prevents any accidental displacement of the handle assembly.

Referring now particularly to FIG. 8, the corner casting in this position has a base thickness of approximately 1 inches. Thus, when the rod 37 and handle 38 is rotated to the position shown in FIG. 8, the end of the cam surface 48 where it meets the cam surface 47, forms a notch or stop which engages the projections 45 and limits the upward movement of the shank and cone thereby effectively locking the cone in the position against the increased thickness base corner casting. Again the spring mechanism disclosed is effective to prevent any accidental unlocking of the assembly. It is, of course, also clearly apparent that the spring action in every case prevents the arm 37 from moving accidently as well as the gravitational arrangement provided by the diagonally extending slot. In the position shown in FIGS. 6 and 7, the apertured locking tabs 39 and 38 may be secured by a suitable padlock.

The auxiliary supports 50, which are disposed on opposite sides of the cams 44 also include the cam surfaces 51 on which the rod also is able to slide downwardly. These auxiliary supports are particularly significant in the event of crane loading, misalignment occurs and the container is dropped onto the twist lock cones which exert an additional extraordinary downward force which is absorbed by the guide surfaces 26 of the slots and surfaces 51 of the supports 50.

Thus, it is apparent that an improved locking arrangement has been disclosed and that to unlock the arrangement it is necessary merely to reverse the procedure described. The varying thicknesses thus of container casting bases is accommodated by the unique cam lock members 44 disclosed which assume the proper position as the rod 37 and handle 38 are moved to the selected position for opening and closing the twist lock arrangements.

The primary features of the present invention reside in the fact that effective locking is provided since the gravity force of the handle in moving down to its locked position is always additionally assured by the spring in its tension and the downwardly inclined slot. Thus, every bump in the road during transit will have a tendency to increase the grip of the lock rather than to decrease the same. The accidental opening of the lock is prevented by virtue of the complex movement of the handle and rod. The handle must rotate about its axis to a position 19 degrees on the other side of its vertical position and at the same time be moved horizontally and must work up on the slope of the diagonal guide means against the friction on the mechanism. Thus, an effective locking action is secured. Further, the open position of the lock is secured by the design of the cams which engage the projections 45 on the tubular extension. Any accidental release from the open position must first overcome the spring tension and rotation of the handle in an opposite direction must occur.

Further, advantages reside in the fact that a one hand operation in locking and unlocking is effective. No additional levers need be operated. As soon as the handle is released from its unlocked position and moved halfway to its locked position, it could be released and the remaining movement of the lock will be done automatically within the mechanism itself by virtue of the spring tension and the associated designed parts. Obviously this increases the speed of operation from locking to unlocking and vice versa over the mechanisms known in the prior art.

What is claimed is:

1. In a highway trailer including a chassis having a plurality of cross members, a plurality of coupling assemblies located on lateral portions of the cross members, with each coupling assembly including;

a locking housing, including a top wall and vertical wall means, said top wall including an aperture having mounted therein, an upwardly projecting tubular shear block including a downwardly projecting tubular extension, a vertically extending locking pin having an upper head portion projecting upwardly from said shear block and including a shank portion rotatably mounted and vertically movable in said extension, said extension projecting downwardly within said housing, said vertical wall means including slot means having a downwardly inclined guide portion, the improvement comprising;

a manual operating mechanism for moving said locking pin and head between lock and unlock positions and for varying the positioning of said head to accommodate the different vertical thickness of bases of trailer corner castings, including, rod means connected to said shank portion of said pin to rotate relative thereto about a horizontal axis, said rod means including a portion projecting outwardly from said slot and including a handle, said rod means portion being movable from an unlock position downwardly on said inclined portion whereby said shank portion is rotated about a vertical axis and said head is moved to a lock position relative to the base of a corner casting, first stop means connected to and rotatable with said rod means adapted to engage engageable means on said extension during rotation of said rod means to one position for limiting the vertical position of said head to accommodate a certain vertical thickness base of a corner casting in said locked position, and said rod means including second stop means on said rod and means rotatable therewith and engageable with engageable means on said extension when said rod means is rotated to a second position to accommodate a different vertical thickness of another corner casting base.

2. The invention in accordance with claim 1, and said slot including a horizontal guide portion within which said rod is disposed in said unlock position.

3. The invention in accordance with claim 1, including spring means connecting said rod means and said locking housing for urging said rod means to move downwardly on said guide portion to said lock position.

4. The invention in accordance with claim 3, including stop means rotatable with said rod means into engagement with third stop means on said extension for latching said rod in said unlock position.

5. The invention in accordance with claim 1, including an arm connected to said rod means and spring means connected to said arm and to said housing for urging rotation of said rod means and movement of the same to said locked position.

6. The invention in accordance with claim 1, said first and second stop means being provided on a cam connected to said rod means, and said engageable means on said extension including a cam engageable face engaged by said first and second stop means.

7. The invention in accordance with claim 6, said cam projecting radially outwardly from said rod means and said first and second stop means including camming surfaces disposed radially outwardly in varying distances from the axis of said rod means.

8. The invention in accordance with claim 7, and said cam engageable face engaged by said camming surfaces including a downwardly extending projection on said tubular extension.

9. The invention in accordance with claim 7, and said cam including a stop means forming a continuation of said camming surfaces.

10. The invention in accordance with claim 1, including support means positioned inwardly from said side wall within said housing, said support means having an inclined guide surface conforming generally to said inclined guide portion of said slot.

* * * * *